United States Patent [19]

Gardner, Jr.

[11] Patent Number: 4,763,820
[45] Date of Patent: Aug. 16, 1988

[54] MULTI-PURPOSE VEHICLE GARMENT HANGER

[76] Inventor: Charles Gardner, Jr., 4607 Burstone Ct., Owensboro, 42301

[21] Appl. No.: 872,597

[22] Filed: Jun. 10, 1986

[51] Int. Cl.$^4$ ............................................... B60R 7/00
[52] U.S. Cl. .......................... 224/42.46 A; 224/42.42; 15/236 R; 15/236.02; 211/87; 248/208
[58] Field of Search ................... 30/169, 136; 224/42.45 R, 42.45 A, 421.46 R, 42.46 A, 42.42, 273; 211/87; 248/339, 208; 15/236 R

[56] References Cited

U.S. PATENT DOCUMENTS

| | | | |
|---|---|---|---|
| 2,676,348 | 4/1954 | Brody et al. | 15/236 |
| 2,941,672 | 6/1960 | Lathrop | 211/87 |
| 4,154,383 | 5/1979 | Honatzis | 224/42.46 R |
| 4,683,592 | 8/1987 | Strongwater | 15/236 X |

FOREIGN PATENT DOCUMENTS 1021590 12/1952 France .................... 224/42.46 A Primary Examiner—Henry J. Recla
Assistant Examiner—David Voorhees
Attorney, Agent, or Firm—Warren D. Flackbert

[57] ABSTRACT

A multi-purpose vehicle garment hanger characterized by a flexible body selectively disposed along and retained at a desired location on and by the side window of a vehicle when the side window is at a closed position. Hooks, as loops, for common hooked hanger receiving purposes, are secured to the flexible body, where the latter includes a stop for positive unit placement and/or retention at a desired use location. The arrangement also affords an ice/snow removal function through the provision of a blade defining an edge of a plate member secured to the flexible body.

2 Claims, 1 Drawing Sheet

MULTI-PURPOSE VEHICLE GARMENT HANGER

As is known, most passenger vehicles include hooks or the like in the rear compartment for receiving hooked garment carrying hangers, such attempting to prevent crushing due to folding and/or the piling of one garment upon another. One particular drawback to the preceding, however, is that of location, i.e. such hooks are difficult to readily reach and, sometimes, the hooked hangers per se cause damage to the vehicle liner.

The invention overcomes the preceding problem by presenting a vehicle garment hanger which is selectively positioned in an overlying relationship along and on the upper edge of a side window of the vehicle when the latter is open, and where positive placement is readily accomplished and the hanger retained at a desired location by pressure exerted between the window, when closed, and the window seal.

In addition to the garment hanging function, the invention also serves an added purpose due to a plate member secured to the body thereof, i.e. the latter, which includes a straight beveled edge, is usable for ice/snow removal when taken from the garment hanging location.

In any event, and briefly, the invention is represented by a flexible body, typically made from leather, having a wide base which narrows into a neck, the latter extending over the upper edge of a lowered window and including a stop on its undersurface which prevents retraction when the window is in a raised or closed position. One or more hooks, such as leather loops, are secured to the body, as by knotting, to provide conventional hooked garment hanger support.

Moreover, a plate member, made from a rigid material, such as plexi-glass, and having a beveled lower edge, is secured onto the body, serving selective ice/snow removal purposes.

In other words, the invention readily serves multi-end purposes, to-wit, the selective placement of a garment hanger at a convenient and accessible location within a vehicle, and the functioning of such for ice/snow removal by hand release from the aforesaid use location (or from storage). Pressure, due to window closing, retains the instant garment hanger for positive placement, and the vehicle interior remains free from any structural changes or additions.

DESCRIPTION OF THE FIGURES

In any event, a better understanding of the present invention will become more apparent from the following description, taken in conjunction with the accompanying drawing, wherein.

Figure 1:
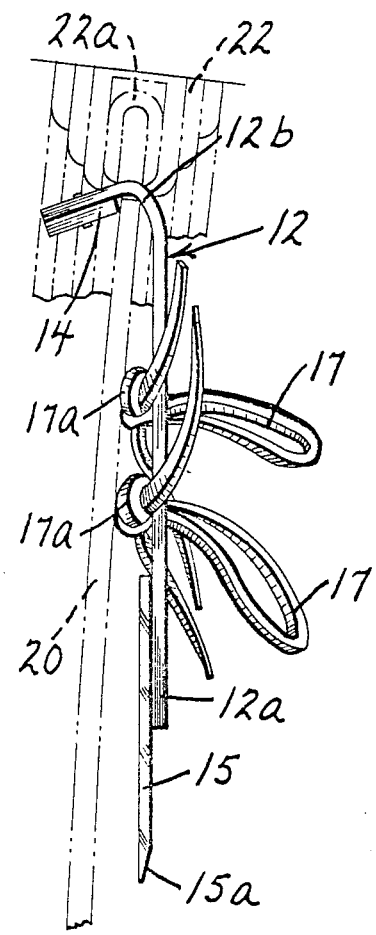
FIG. 1 is a front plan view of a multi-purpose vehicle garment hanger in accordance with the teachings of the present invention; and, FIG. 2 is a view in side elevation detailing the invention as installed in a vehicle window.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the instant multi-purpose vehicle garment hanger is defined by a flexible body member 12, typically made from leather for placement, durability and aesthetic reasons, which includes a wide or enlarged base portion 12a narrowing into an upper neck portion 12b. The upper neck portion 12b has a stop 14, such as a laterally disposed strip, secured to the undersurface thereof proximate its free end, where the latter serves positive placement purposes upon vehicle window closing (to be discussed herebelow—but see FIG. 2).

Base portion 12a has a plate member 15 secured thereto, as by the use of an adhesive, for example, such plate member 15 typically being formed from a strong rigid material, such as plexi-glass. Plate member 15 has a lower edge 15a which is preferably beveled and straight, serving effective ice/snow cleaning after removal from the usual window location (or even if stored, for example, when not in use, as in the glove compartment of the vehicle).

In order to retain a typical hooked garment hanger (not shown), hooks 17, such as loops, also made from leather, are secured to the body member 12, facing into the passenger compartment. Securement of the hooks 17 is typically achieved by knotting, as at 17a.

Figure 2:
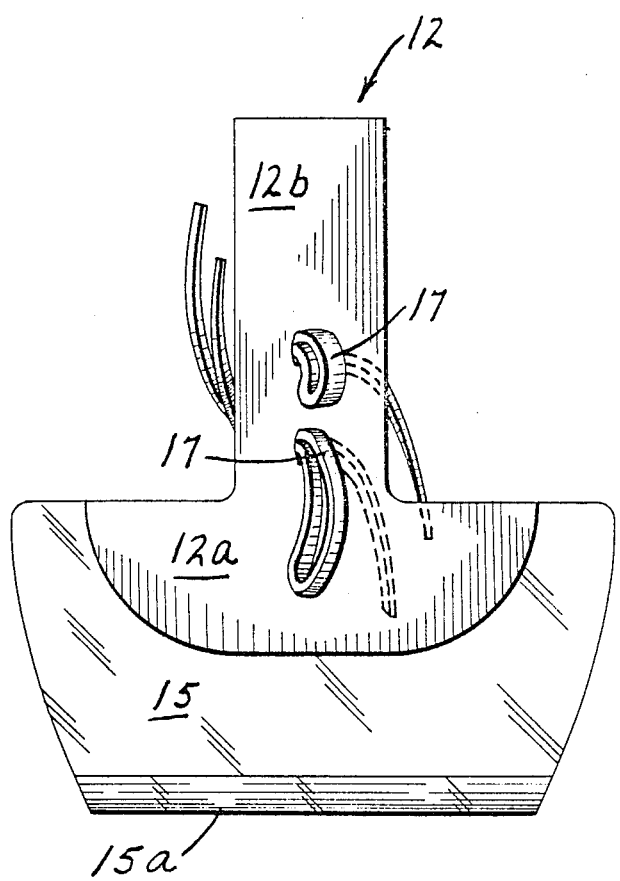

With particular reference now to FIG. 2, the invention is disclosed in an installed or use condition in a side window (when closed) of a common vehicle. The window 20 (shown in phantom) bears against the upper neck portion 12b formed on base portion 12a, i.e. exerts the latter into contact with felt stripping 22a forming part of a conventional window seal assembly 22 (also shown in phantom). The stop 14 prevents invention removal upon placement and after window 20 closing.

As evident, gravity places the flexible body member 12 into a substantially vertical position, meaning that looped hooks 17 are ready to receive the hook (not shown) of a common garment receiving hanger. Thus, the invention permits usage anywhere along a desired window, precluding the cramping oftentimes encountered by existing difficult to reach clothes hook placement in the vehicle passenger compartment.

Additionally, when in storage, or when released from a hanging position, the invention is useful for ice/snow removal from the vehicle windows, i.e. through the straight and beveled lower edge 15a of the plate member 15. As apparent, compactness further aids this phase of invention versatility.

The presented features are, therefore, readily recognizable and the description herein should be considered illustrative, as various modifications can be made within the spirit of the invention. In this connection, and by way of example, proportioning may be varied; other than the mentioned materials employed; the overall plan configuration modified; and, the like. Thus, the preceding should not be deemed to limit the scope of the following claims.

I claim:

1. A garment hanger for a vehicle having a window movable from an open position to a closed position bearing against a window seal comprising a flexible body member including an upper neck portion selectively overlying the edge of said window at said open positon, a rigid plate member affixed to said flexible body member and hanging within said vehicle at a use condition, a hooking member in the form of looped material extending through said upper neck portion of said flexible body member and knotted in a securing relationship, said hooking member also being disposed within said vehicle at a use condition, and a stop disposed on the undersurface of said upper neck portion of said flexible body member outside of said window serving to prevent withdrawal of said flexible body member when said window is bearing against said window seal at said closed position, where said stop is a strip laterally disposed with respect to the longitudinal axis of said upper neck portion.

2. The garment hanger of claim 1 where said rigid plate member includes a beveled lower edge selectively serving ice/snow removal purposes.

* * * * *